United States Patent
Takenaka et al.

(10) Patent No.: US 8,012,596 B2
(45) Date of Patent: Sep. 6, 2011

(54) PHOTOCHROMIC LENS SUBSTRATE

(75) Inventors: Junji Takenaka, Shunan (JP); Hironobu Nagoh, Shunan (JP); Junji Momoda, Shunan (JP)

(73) Assignee: Tokuyama Corporation, Shunan-shi (JP)

( * ) Notice: Subject to any disclaimer, the term of this patent is extended or adjusted under 35 U.S.C. 154(b) by 296 days.

(21) Appl. No.: 10/549,696

(22) PCT Filed: Mar. 17, 2004

(86) PCT No.: PCT/JP2004/003539
§ 371 (c)(1),
(2), (4) Date: Sep. 19, 2005

(87) PCT Pub. No.: WO2004/083268
PCT Pub. Date: Sep. 30, 2004

(65) Prior Publication Data
US 2006/0182977 A1 Aug. 17, 2006

(30) Foreign Application Priority Data
Mar. 20, 2003 (JP) .................. 2003-077114
Aug. 26, 2003 (JP) .................. 2003-208784

(51) Int. Cl.
*B32B 27/30* (2006.01)
*C08F 36/22* (2006.01)

(52) U.S. Cl. ........ 428/522; 428/521; 428/913; 526/321; 526/323.2; 526/325; 526/326

(58) Field of Classification Search .................. 351/166; 428/521, 522, 913; 526/321, 323.2, 325, 526/326
See application file for complete search history.

(56) References Cited

U.S. PATENT DOCUMENTS

| | | | |
|---|---|---|---|
| 3,713,869 A * | 1/1973 | Geffcken et al. ............ 427/489 |
| 4,261,656 A | 4/1981 | Wu | |
| 4,607,087 A | 8/1986 | Moriya et al. | |
| 5,200,116 A | 4/1993 | Heller | |
| 5,200,483 A | 4/1993 | Selvig | |
| 5,556,931 A * | 9/1996 | Imura et al. ............... 526/323.1 |
| 5,963,373 A * | 10/1999 | Kayanoki ................... 359/581 |
| 6,034,193 A * | 3/2000 | Henry et al. ............... 526/222 |
| 6,391,433 B2 * | 5/2002 | Jiang et al. ................. 428/220 |
| 6,802,993 B2 * | 10/2004 | Momoda et al. ........... 252/586 |
| 6,864,299 B1 * | 3/2005 | Komuro et al. ............ 522/13 |
| 6,913,357 B2 * | 7/2005 | Kadowaki ................. 351/177 |
| 7,087,195 B2 * | 8/2006 | Kawasaki .................. 252/586 |
| 2003/0008149 A1 | 1/2003 | Moravec et al. | |
| 2003/0008958 A1 * | 1/2003 | Momoda et al. ........... 524/368 |
| 2003/0036579 A1 | 2/2003 | Momoda et al. | |
| 2005/0263745 A1 * | 12/2005 | Momoda et al. ........... 252/586 |
| 2006/0182977 A1 | 8/2006 | Takenaka et al. | |

FOREIGN PATENT DOCUMENTS

| | | |
|---|---|---|
| EP | 0 404 599 A2 | 12/1990 |
| EP | 1130038 A1 * | 9/2001 |
| EP | 1 359 170 | 11/2003 |
| EP | 1 388 749 | 2/2004 |
| EP | 1 433 814 | 6/2004 |
| JP | 10-338869 A | 12/1998 |
| JP | 11-269233 A | 10/1999 |
| JP | 2002-105139 A | 4/2002 |
| JP | 2003-342310 | 12/2003 |
| JP | 2004-131593 | 4/2004 |
| JP | 2005-68192 | 3/2005 |
| JP | 2005-239887 | 9/2005 |
| WO | WO-01/05854 A1 | 1/2001 |
| WO | WO-02/48220 A1 | 6/2002 |
| WO | WO-02/093236 A1 | 11/2002 |
| WO | WO 03/099550 | 12/2003 |
| WO | WO 2004/083268 | 9/2004 |

OTHER PUBLICATIONS

Non-Final Office Action issued Jul. 27, 2009 in U.S. Appl. No. 11/667,317.
Non-Final Office Action issued on Oct. 23, 2009 in U.S. Appl. No. 11/667,317.
Final Office Action issued Apr. 21, 2010 in U.S. Appl. No. 11/667,317.

* cited by examiner

*Primary Examiner* — Callie E Shosho
*Assistant Examiner* — John Freeman
(74) *Attorney, Agent, or Firm* — Birch, Stewart, Kolasch & Birch, LLP

(57) ABSTRACT

A polymerization curable composition comprising a specific polyfunctional polymerizable monomer having a hard molecular structure with an L-scale Rockwell hardness of its homopolymer of 60 or more, a specific polyfunctional polymerizable monomer and a photochromic compound, a photochromic lens substrate composed of a cured product of the polymerization curable composition, and a lens comprising the photochromic lens substrate.

The substrate and lens show excellent photochromic properties such as high color development density and high fading rate, and the cured product has excellent substrate properties such as hardness, heat resistance and impact resistance as well as strength (toughness) that allows for its use in rimless spectacles.

8 Claims, No Drawings

PHOTOCHROMIC LENS SUBSTRATE

FIELD OF THE INVENTION

The present invention relates to a photochromic lens substrate comprising a cured product having excellent photochromic properties and high strength, a polymerization curable composition which provides the same and a photochromic lens.

DESCRIPTION OF THE PRIOR ART

Photochromic spectacles function as sunglasses outdoors where their lenses darken swiftly upon exposure to light including ultraviolet radiation such as sunlight and as normal transparent spectacles indoors where their lenses recover transparency without exposure. Demand for the above photochromic spectacles is growing.

As one of the methods of producing a photochromic plastic lens, there is known a method in which a photochromic compound is dissolved in a monomer and the resulting mixture solution is polymerized to obtain a photochromic lens directly (to be referred to as "inmass method" hereinafter).

In this method, photochromism is provided simultaneously with the molding of a lens. Therefore, the method has an advantage that a photochromic plastic lens is obtained in one stage as compared with a method in which photochromism is provided after a lens is molded.

Photochromism is developed when a photochromic compound absorbs light energy to cause its reversible structural change. However, in a photochromic plastic lens obtained by the inmass method, the photochromic compound cannot fully develop its photochromic properties such as color development density and fading rate in most cases as it is dispersed in a resin matrix. This is because the free space is much smaller in the matrix and accordingly, this structural change is more easily restricted than in a monomer solution. Particularly when a high-molecular weight photochromic compound is dispersed in a resin matrix having high hardness and high heat resistance, this tendency is striking. For example, when a photochromic compound having a molecular weight of 300 or more is dispersed in a resin composition generally used as a plastic lens substrate, the fading half-life period of the photochromic compound becomes very long (fading rate becomes very low), and the fading rate of the photochromic compound in the resin matrix may become 50 times or more lower than that of the photochromic compound in a monomer solution.

The pamphlet of International Publication No. WO01/05854 discloses a polymerization curable composition (may also be referred to as "composition of the prior art" hereinafter) which comprises (A) a polymerizable monomer having an L-scale Rockwell hardness of its homopolymer of 40 or less, (B) a polyfunctional polymerizable monomer having a functionality of 3 or more and an L-scale Rockwell hardness of its homopolymer of 60 or more, (C) a bifunctional polymerizable monomer having an L-scale Rockwell hardness of its homopolymer of 60 or more, and (D) a photochromic compound as a curable composition which has no problems as above, that is, which provides a photochromic cured product having excellent photochromic properties, high hardness and high heat resistance.

The above composition of the prior art is extremely useful as a raw material composition for the manufacture of a photochromic plastic lens by the inmass method. However, it has been found that when holes are drilled in a lens substrate in order to use a cured product obtained by curing the composition as the lens substrate of rimless spectacles which have recently become popular, that is, which are manufactured by drilling holes in lenses directly and fitting a frame in the holes, there arises a problem that the lens substrate cracks or that the lens of a fixing portion is broken by placing the fixed frame under load even when there has been no problem in drilling.

SUMMARY OF THE INVENTION

It is an object of the present invention to provide a photochromic lens substrate which exhibits excellent photochromic properties such as high color development density and high fading rate and has excellent substrate properties such as high hardness and high heat resistance as well as high strength and toughness that allow for its use in rimless spectacles.

It is another object of the present invention to provide a polymerization curable composition which provides the above lens substrate.

It is still another object of the present invention to provide a photochromic lens comprising the lens substrate of the present invention.

Other objects and advantages of the present invention will become apparent from the following description.

According to the present invention, firstly, the above objects and advantages of the present invention are attained by a photochromic lens substrate, which comprises a cured product of a polymerization curable composition comprising:
(I) a polyfunctional polymerizable monomer represented by the following formula (1):

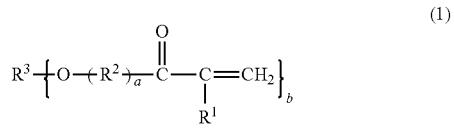

wherein $R^1$ is a hydrogen atom or methyl group, the group $-R^2-$ is $-CH_2CH_2O-$, $-CH_2CH(CH_3)O-$ or $-C(=O)CH_2CH_2CH_2CH_2CH_2O-$, $R^3$ is a trifunctional to hexafunctional organic residue, a is an integer of 0 to 3, and b is an integer of 3 to 6;

(II) a bifunctional polymerizable monomer represented by the following formula (2):

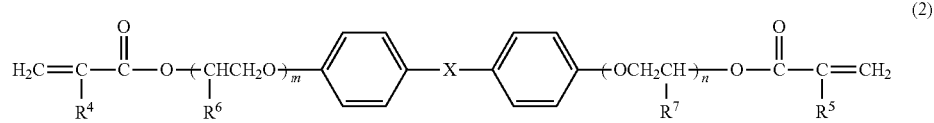

wherein $R^4$ and $R^5$ are each independently a hydrogen atom or methyl group, $R^7$ and $R^6$ are each independently a hydrogen atom or alkyl group having 1 or 2 carbon atoms, the group —X— is —O—, —S—, —S(=O)$_2$—, —C(=O)—O—, —CH$_2$—, —CH=CH— or —C(CH$_3$)$_2$—, and m and n satisfy (m+n)=0 to 30; and (III) a photochromic compound, wherein the fading half-life period of the photochromic compound (HI) in the cured product is 30 times or less shorter than the fading half-life period of the photochromic compound (III) in the polymerization curable composition, and the lens substrate has a tensile strength of 15 Kgf or more.

According to the present invention, secondly, the above objects and advantages of the present invention are attained by a polymerization curable composition (may be referred to as "thermopolymerization curable composition" hereinafter) comprising:

(I) a polyfunctional polymerizable monomer represented by the above formula (1);
(II) a bifunctional polymerizable monomer represented by the above formula (2);
(III) other polymerizable monomer different from the above polymerizable monomers (I) and (II);
(IV) a photochromic compound; and
(V) a thermopolymerization initiator, wherein the amounts of the polyfunctional polymerizable monomer (I), the bifunctional polymerizable monomer (II) and the other polymerizable monomer (III) are 1 to 15 wt %, 10 to 80 wt % and 5 to 89 wt %, respectively, based on the total of all the polymerizable monomers.

According to the present invention, thirdly, the above objects and advantages of the present invention are attained by a polymerization curable composition (may be referred to as "photopolymerization curable composition" hereinafter) comprising:

(I) a polyfunctional polymerizable monomer represented by the above formula (1);
(II) a bifunctional polymerizable monomer represented by the above formula (2);
(III) optionally by other polymerizable monomer different from the above polymerizable monomers (I) and (II);
(IV) a photochromic compound; and
(V) a photopolymerization initiator, wherein the amounts of the polyfunctional polymerizable monomer (I), the bifunctional polymerizable monomer (II) and the other polymerizable monomer (III) are 1 to 60 wt %, 10 to 90 wt % and 0 to 89 wt %, respectively, based on the total of all the polymerizable monomers.

Finally, according to the present invention, the above objects and advantages of the present invention are attained by a photochromic lens which comprises the above photochromic lens substrate of the present invention, a hard coat layer and a buffer layer, interposed between the substrate and the hard coat layer and having lower pencil hardness than the hard coat layer, for bonding the substrate to the hard coat layer.

BEST MODE FOR THE EMBODIMENT OF THE INVENTION

The photochromic lens substrate of the present invention is composed of a cured product of a polymerization curable composition which comprises a polyfunctional polymerizable monomer represented by the above formula (1), a bifunctional polymerizable monomer represented by the above formula (2) and a photochromic compound. The photochromic compound in the cured product has a fading half-life period which is 30 times or less shorter than the fading half-life period of the photochromic compound in the polymerization curable composition, and the cured product has a tensile strength of 20 Kgf or more.

The term "fading half-life period" as used herein means the time it takes for the absorbance at the maximum wavelength to drop to ½ the absorbance at the time of color development when the light exposure of the photochromic compound is stopped after it is exposed to light to develop color as defined in examples which will be given hereinafter. This is an index of fading rate which is one of the most important photochromic properties. The fading half-life period of the photochromic compound in the substrate is 30 times or less, preferably 10 times or less, more preferably 7 times or less, particularly preferably 5 times or less shorter than the fading half-life period of the photochromic compound in the polymerization curable composition before curing, which means that the photochromic compound has excellent photochromism. The fading half-life period of the photochromic compound in the cured product is preferably 4 minutes or less, more preferably 2 minutes or less.

The term "tensile strength" means an index of drilling strength. That is, it means tensile strength when a disk-like specimen which has a thickness of 2±0.5 mm and a main surface area of 10 to 40 cm$^2$ and may be curved is prepared, two 2 mm-diameter holes are drilled in the specimen with two points on arbitrary straight lines passing the gravity center of the specimen or nearby at positions 4 mm inward from two intersecting points between the straight lines and the periphery of the specimen as the centers thereof, and 1.6 mm-diameter stainless steel rods are inserted into the two holes, fixed to upper and lower chucks of a tensile tester and pulled at a rate of 5 mm/min. In the tensile strength test defined above, the destruction of the specimen generally occurs near the holes formed by drilling, and the tensile strength of what is generally used as a spectacle lens is rarely influenced by the shape of its substrate. Since the shape and size of a spectacle lens before and after it is processed into its use form are within the ranges of the above specimen, the above tensile strength becomes an index of drilling strength of the spectacle lens. When the above tensile strength is used as an index of the drilling strength of the spectacle lens, two holes are preferably drilled in the spectacle lens which has been processed into its actual use form at almost the same positions as the attaching positions of a rimless frame (that is, arm members connected to hinges) to carry out a tensile test.

For use in rimless spectacles, the tensile strength of the above lens substrate must be 20 Kgf or more. When the tensile strength is 15 Kgf or more and the use of the lens substrate in rimless spectacles is monitored, the lens substrate shows good results and does not greatly crack when a 2 mm-diameter hole is drilled at an arbitrary position of the substrate at 2,100 rpm (at a rate of 1 hole/sec or less). If the substrate cracks, the crack will be as long as 0.4 mm or less.

In the present invention, (I) a polyfunctional polymerizable monomer represented by the following formula (1) is used:

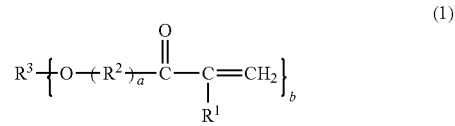

wherein $R^1$ is a hydrogen atom or methyl group, the group —$R^2$— is —CH$_2$CH$_2$O—, —CH$_2$CH(CH$_3$)O— or —C(=O)CH$_2$CH$_2$CH$_2$CH$_2$CH$_2$)—, R$^3$ is a trifunctional to hexafunctional organic residue, a is an integer of 0 to 3, and b is an integer of 3 to 6.

The monomer is the component (B) in the composition of the prior art disclosed by the pamphlet of the above WO01/05854, that is, a polymerizable monomer having a functionality of 3 or more and an L-scale Rockwell hardness of its homopolymer of 60 or more. By using this monomer, a cured product having excellent photochromic properties typified especially by fading half-life period can be obtained. Specific examples of the polyfunctional polymerizable monomer which can be advantageously used from the viewpoint of acquisition ease include trimethylolpropane trimethacrylate, trimethylolpropane triacrylate, tetramethylolmethane trimethacrylate, tetramethylolmethane triacrylate, tetramethylolmethane tetramethacrylate, tetramethylolmethane tetraacrylate, trimethylolpropane triethylene glycol trimethacrylate, trimethylolpropane triethylene glycol triacrylate, ethoxylated pentaerythritol tetraacrylate, ethoxylated pentaerythritol tetramethacrylate, pentaerythritol trimethacrylate, pentaerythritol tetramethacrylate, caprolactam modified ditrimethylolpropane tetraacrylate, caprolactam modified ditrimethylolpropane tetramethacrylate and caprolactam modified dipentaerythritol hexaacrylate. They may be used alone or in combination of two or more.

In the present invention, (II) a bifunctional polymerizable monomer represented by the following formula (2) is used:

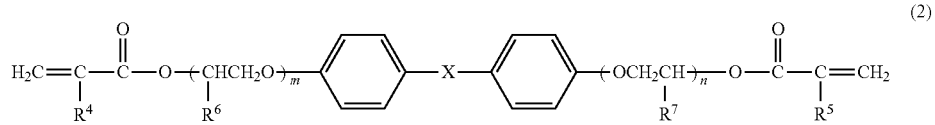

(2)

wherein R$^4$ and R$^5$ are each independently a hydrogen atom or methyl group, R$^6$ and R$^7$ are each independently a hydrogen atom or alkyl group having 1 or 2 carbon atoms, the group —X— is —O—, —S—, —S(=O)$_2$—, —C(=O)—O—, —CH$_2$—, —CH=CH— or —C(CH$_3$)$_2$—, and m and n satisfy (m+n)=0 to 30.

The bifunctional polymerizable monomer is the component (C) in the composition of the prior art which is disclosed by the pamphlet of WO01/05854, that is, a monomer included in a bifunctional polymerizable monomer having an L-scale Rockwell hardness of its homopolymer of 60 or more when (m+n) is smaller than 8, or the component (A) in the composition of the prior art, that is, a monomer included in a polymerizable monomer having an L-scale Rockwell hardness of its homopolymer of 40 or less when (m +n) is 8 or more. The term "L-scale Rockwell hardness" is a value determined based on JIS K7202, more specifically a value obtained from the difference h (unit of mm) in the indentation of an indenter before and after the application of a standard load based on the expression (130-500h) when a standard load of 10 Kgf is applied to the surface of a cured specimen by using the indenter which is a 6,350 mm-diameter steel ball, a test load of 60 Kgf is then applied to the specimen, and the load is returned to the standard load.

A cured product having excellent strength and toughness can be obtained by using the bifunctional polymerizable monomer. Out of the above bifunctional polymerizable monomers, preferred examples of the bifunctional polymerizable monomer which can be advantageously used from the viewpoint of acquisition ease include 2,2-bis[4-(methacryloyloxypolyethoxy)phenyl]propane (average value of (m+n) is 2),
2,2-bis[4-(methacryloyloxypolyethoxy)phenyl]propane (average value of (m+n) is 2.6),
2,2-bis[4-(methacryloyloxypolyethoxy)phenyl]propane (average value of (m+n) is 4),
2,2-bis[4-(methacryloyloxypolyethoxy)phenyl]propane (average value of (m+n) is 10),
2,2-bis[4-(methacryloyloxypolyethoxy)phenyl]propane (average value of (m+n) is 30),
2,2-bis[4-acryloyloxypolyethoxylphenyl]propane (average value of (m+n) is 4),
2,2-bis[4-methacryloyloxypolypropoxy]phenyl]propane (average value of (m+n) is 4),
2,2-bis[4-methacryloyloxypolypropoxy]phenyl]propane (average value of (m +n) is 10),
bis[4-methacryloyloxypolyethoxy]phenyl]methane (average value of (m+n) is 4) and
bis[4-methacryloyloxypolyethoxy)phenyl]sulfone (average value of (m+n) is 4). They may be used alone or in combination of two or more.

The bifunctional polymerizable monomer (II) is preferably a combination of a first bifunctional polymerizable monomer of the above formula (2) in which (m+n) is 0 to 5 and a second bifunctional polymerizable monomer of the above formula (2) in which (m+n) is 6 to 30 in a molar ratio of 1:3 or less, preferably 1:0 to 2.

Illustrative examples of the first bifunctional polymerizable monomer of the formula (2) in which (m+n) is 0 to 5 (most of them correspond to the component C of the composition of the prior art) include
2,2-bis[4-(methacryloyloxy)phenyl]propane (average value of (m+n) is 0),
2,2-bis[4-(methacryloyloxyethoxy)phenyl]propane (average value of (m+n) is 2),
2,2-bis[4-(methacryloyloxydiethoxy)phenyl]propane (average value of (m+n) is 4),
2,2-bis[4-(acryloyloxyethoxy)phenyl]propane (average value of (m+n) is 2),
2,2-bis[4-(methacryloyloxypropoxy)phenyl]propane (average value of (m+n) is 2),
bis[4-(methacryloyloxydiethoxy)phenyl]methane (average value of (m+n) is 4) and
bis[4-(methacryloyloxyethoxy)phenyl)sulfone (average value of (m+n) is 2).

Illustrative examples of the second bifunctional polymerizable monomer of the formula (2) in which (m+n) is 6 to 30 include
2,2-bis[4-(methacryloyloxypolyethoxy)phenyl]propane (average value of (m+n) is 10), 2,2-bis[4-(methacryloyloxypolyethoxy)phenyl]propane (average value of (m+n) is 30), 2,2-bis[4-(acryloyloxypolyethoxy)phenyl]propane (average value of (m+n) is 10), 2,2-bis[4-(methacryloyloxypolypropoxy)phenyl]propane (average value of (m+n) is 10), bis[4-(methacryloyloxypolyethoxy)phenyl]methane (average value of (m+n) is 10) and bis[4-(methacryloyloxypolyethoxy)phenyl]sulfone (average value of (m+n) is 10).

When the molar amount of the second bifunctional polymerizable monomer is more than 3 times larger than that of the first bifunctional polymerizable monomer, strength (toughness) that enables the obtained lens substrate to be used in rimless spectacles may not be obtained.

The polymerization curable composition may comprise a polymerizable monomer other than the above components (I) and (II) as a polymerizable monomer. Any known polymerizable monomer may be used if it is a monomer other than a polyfunctional polymerizable monomer having a functionality of 3 or more and an L-scale Rockwell hardness of its homopolymer of 60 or more. For example, the following monomers enumerated as examples of the components (A) and (C) (excluding specific bifunctional monomers) used in the curable composition (composition of the prior art) disclosed by the pamphlet of WO01/05854 can be advantageously used.

Examples of the component (A) include polyethylene glycol methacrylate having an average molecular weight of 526, polyethylene glycol methacrylate having an average molecular weight of 360, methyl ether polyethylene glycol methacrylate having an average molecular weight of 475, methyl ether polyethylene glycol methacrylate having an average molecular weight of 1,000, polypropylene glycol methacrylate having an average molecular weight of 375, polypropylene glycol methacrylate having an average molecular weight of 430, stearyl metahcrylate, lauryl methacrylate, ethylene glycol glycidyl ether, propylene glycol glycidyl ether, tetraethylene glycol diacrylate and nonaethylene glycol diacrylate.

Examples of the component (C) include diethylene glycol dimethacrylate, triethylene glycol dimethacrylate, tetraethylene glycol dimethacrylate, tripropylene glycol dimethacrylate, tetrapropylene glycol dimethacrylate, nonaethylene glycol dimethacrylate, nonapropylene glycol dimethacrylate, ethylene glycol bisglycidyl methacrylate, 1,4-butylene glycol dimethacrylate, 1,9-nonylene glycol dimethacrylate and neopentylene glycol dimethacrylate.

Examples of the polymerizable monomer other than the components (A) and (C) include polyallyl compounds such as diallyl phthalate, diallyl isophthalate and diallyl tartarate; acrylate and methacrylate compounds such as glycidyl acrylate, glycidyl methacrylate, methyl acrylate, methyl methacrylate and benzyl methacrylate; and vinyl compounds such as styrene, chlorostyrene, methylstyrene, vinyl naphthalene, α-methylstyrene dimer, bromostyrene and divinylbenzene.

Further, bifunctional to hexafunctional polymerizable polyurethane oligomers and bifunctional to hexafunctional polymerizable polyester oligomers may be advantageously used as the other monomer.

The bifunctional to hexafunctional polymerizable polyurethane oligomers are obtained by adding hydroxyacrylic acid or hydroxymethacrylic acid to the isocyanate group remaining on a polyurethane skeleton synthesized from a diisocyanate and a polyol. Examples of the diisocyanate include tolylene diisocyanate, 4,4-diphenylmethane diisocyanate, xylylene diisocyanate, hexamethylene diisocyanate, isophorone diisocyanate, methylenebis(4-cyclohexylisocyanate) and trimethylhexamethylene diisocyanate. Examples of the polyol include polypropylene oxide diol, copolyethylene oxide-propylene oxide diol, polytetramethylene oxide diol, ethoxylated bisphenol A, ethoxylated bisphenol S spiroglycol, caprolactone modified diol, carbonate diol and polyester diol.

These bifunctional to hexafunctional polymerizable polyurethane oligomers may be used alone or in combination of two or more.

The bifunctional to hexafunctional polymerizable polyester oligomers are obtained by condensing acrylic acid or methacrylic acid to the hydroxyl group remaining on a polyester skeleton synthesized from a polyol and a polybasic acid. Examples of the polyol include diethylene glycol, triethylene glycol, 1,6-hexanediol, trimethylolpropane and pentaerythritol, and examples of the polybasic acid include phthalic anhydride, adipic acid and trimellitic acid.

The bifunctional to hexafunctional polyester oligomers may be used alone or in combination of two or more.

A combination of a bifunctional polymerizable monomer represented by the above formula (2) and a bifunctional to hexafunctional polymerizable polyurethane oligomer as other polymerizable monomer is preferred because it provides good balance between photochromism and strength and toughness that enable the obtained lens substrate to be used in rimless spectacles to the cured product.

As for the composition of all the polymerizable monomers contained in the cured product, the amounts of the polyfunctional polymerizable monomer (I), the bifunctional polymerizable monomer (II) and the other polymerizable monomer (III) in the polymerization curable composition are preferably 1 to 60 wt %, 10 to 90 wt % and 0 to 89 wt %, more preferably 3 to 50 wt %, 20 to 60 wt % and 30 to 77 wt %, respectively, from the viewpoint of balance among physical properties of the obtained cured product.

Known photochromic compounds such as chromene compounds, fulgimide compounds and spirooxazine compounds may be used as the photochromic compound (III) in the polymerization curable composition without restriction. When high-molecular weight photochromic compounds having a molecular weight of 200 or more, specifically 500 or more are used out of these, the effect of the present invention that the obtained cured product shows excellent photochromic properties is striking. Therefore, the photochromic compounds are preferably used. Out of these photochromic compounds, chromene compounds are particularly preferred because they are superior to other compounds in photochromic properties such as color development density and fading rate. Photochromic compounds which can be advantageously used in the present invention are given below. These compounds may be used alone or in combination of two or more. In general, one or more other photochromic compounds (including the following compounds and other photochromic compounds) are often used in combination with the above compounds to adjust the tone of developed color.

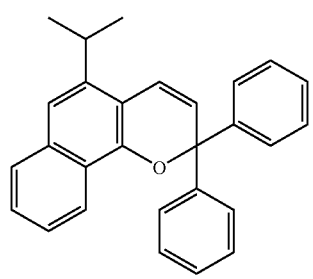

Molecular weight of 376

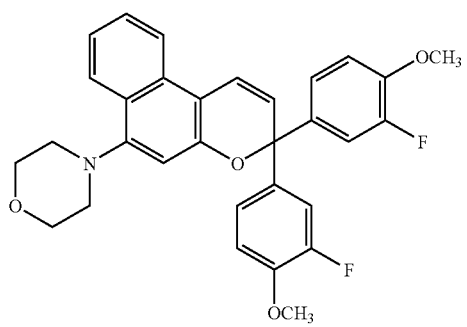
Molecular weight of 515

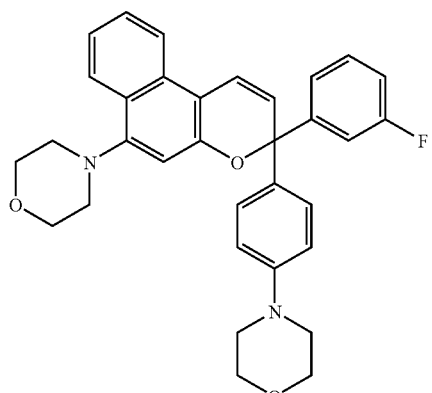
Molecular weight of 522

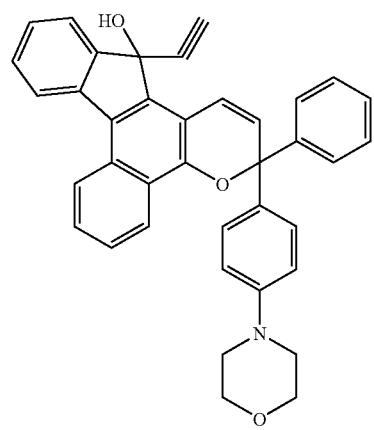
Molecular weight of 547

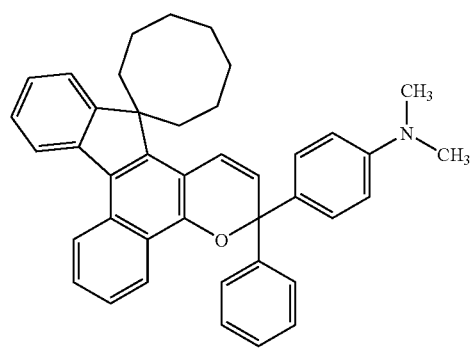
Molecular weight of 561

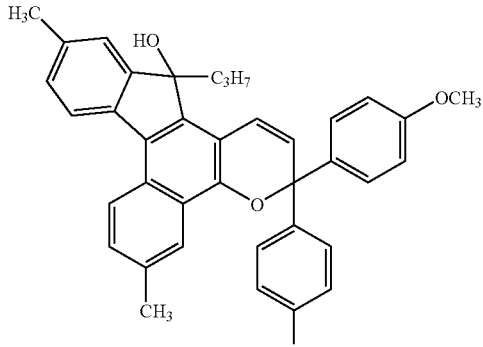
Molecular weight of 568

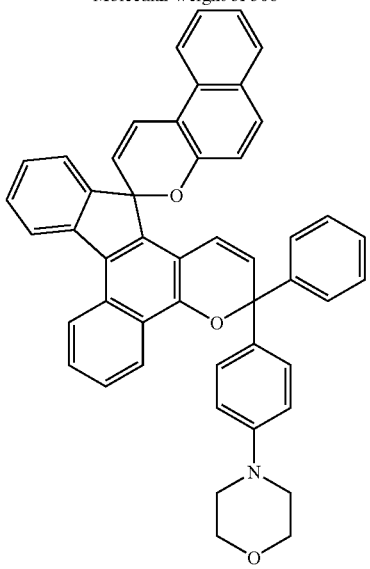
Molecular weight of 673

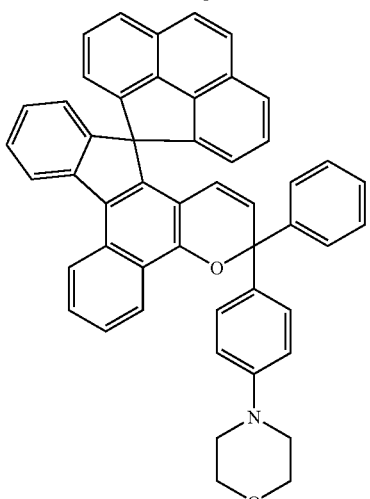
Molecular weight of 681

The amount of the photochromic compound contained in the curable composition is not particularly limited but preferably 0.001 to 5 parts by weight, particularly preferably 0.01 to 2 parts by weight based on 100 parts by weight of the total of all the polymerizable monomers from the viewpoint of uniform dispersibility.

Additives may be further added to the polymerization curable composition of the present invention in limits that do not impede the effect of the present invention in order to improve the durability, color development rate and fading rate of the photochromic compound and moldability. Additives which can be advantageously used include a surfactant, antioxidant, radical scavenger, ultraviolet light stabilizer, ultraviolet light absorber, release agent, color protection agent, antistatic agent, fluorescent dye, dye, pigment and perfume.

The amount of the surfactant is preferably 0 to 20 parts by weight based on 100 parts by weight of the total of all the polymerizable monomers. The amounts of the antioxidant, radical scavenger, ultraviolet light stabilizer, ultraviolet light absorber, release agent, color protection agent, antistatic agent, fluorescent dye, dye, pigment and perfume are each preferably 0 to 2 parts by weight based on 100 parts by weight of the total of all the polymerizable monomers.

The process for producing a cured product by curing the above polymerization curable composition is not particularly limited. Predetermined amounts of the components may be weighed and suitably mixed together. The order of mixing these components is not particularly limited. The method of curing is not particularly limited as well, curing can be carried out by heat and/or light, and a polymerization initiator may be used as required.

For example, to optically cure the polymerization curable composition of the present invention, the composition is injected into the cavity between molds held by an elastomer gasket or spacer and exposed to activation energy rays from a metal halide lamp, intermediate-pressure mercury lamp, high-pressure mercury lamp, super high-pressure mercury lamp, bactericidal lamp, xenon lamp, tungsten lamp or fluorescent lamp as a light source. For the exposure of activation energy rays, a UV cut filter for cutting a wavelength of 400 nm or less, for example, is preferably used to prevent the photochromic compound from absorbing activation energy rays (color is generally developed by absorbing ultraviolet rays having a wavelength of about 380 to 400 nm).

Examples of the thermopolymerization initiator used for curing by heat which is not particularly limited include diacyl peroxides such as benzoyl peroxide, p-chlorobenzoyl peroxide, decanoyl peroxide, lauroyl peroxide and acetyl peroxide; peroxy esters such as t-butyl peroxy-2-ethylhexanoate, t-butyl peroxydicarbonate, cumyl peroxyneodecanoate, t-butyl peroxybenzoate and t-butyl peroxyisobutyrate; percarbonates such as diisopropyl peroxydicarbonate, di-2-ethylhexyl peroxydicarbonate and di-sec-butyloxycarbonate; and azo compounds such as 2,2'-azobisisobutyronitrile, 2,2'-azobis(4-dimethylvaleronitrile), 2,2'-azobis(2-methylbutyronitrile) and 1,1'-azobis(cyclohexane-1-carbonitrile).

Examples of the photopolymerization initiator used for curing by light which is not particularly limited include benzoin, benzoin methyl ether, benzoin butyl ether, benzophenol, acetophenone, 4,4'-dichlorobenzophenone, diethoxyacetophenone,
2-hydroxy-2-methyl-1-phenylpropan-1-one, benzyl methyl ketal,
1-(4-isopropylphenyl)-2-hydroxy-2-methylpropan-1-one,
1-hydroxycyclohexylphenyl ketone, 2-isopropylthioxanthone,
bis(2,4,6-trimethylbenzoyl)phenylphosphine oxide and
bis(2,6-dimethoxybenzoyl)-2,4,4-trimethylpentylphosphine oxide.

The amount of the polymerization initiator is not particularly limited but preferably 0.001 to 10 parts by weight, particularly preferably 0.01 to 3 parts by weight based on 100 parts by weight of the total of all the polymerizable monomers in order to fully promote polymerization and prevent the excess polymerization initiator from remaining in the cured product.

When the above polymerization curable composition contains a thermopolymerization initiator, the above polyfunctional polymerizable monomer (I) and the above bifunctional polymerizable monomer (II) are contained in amounts of 1 to 15 wt % and 10 to 80 wt %, preferably 3 to 10 wt % and 20 to 60 wt %, respectively, based on the total of all the polymerizable monomers contained in the polymerization curable composition. When the above polymerization curable composition contains a photopolymerization initiator, the above polyfunctional polymerizable monomer (I) and the above bifunctional polymerizable monomer (II) are contained in amounts of 1 to 60 wt % and 10 to 90 wt %, particularly preferably 10 to 60 wt % and 20 to 90 wt %, respectively, based on the total of all the polymerizable monomers contained in the polymerization curable composition.

As for the former polymerization curable composition which contains a thermopolymerization initiator, when the amount of the polyfunctional polymerizable monomer (I) is smaller than 1 wt %, satisfactory photochromic properties cannot be obtained and when the amount is larger than 15 wt %, strength and toughness required for rimless spectacles are hardly obtained. The preferred amount of the polyfunctional polymerizable monomer (I) which depends on the amount of the bifunctional polymerizable monomer (II) is 1 to 10 wt % when the amount of the component (II) is smaller than 40 wt % and 3 to 15 wt % when the amount of the component (II) is 40 wt % or more. Within the above range, a cured product having excellent balance between photochromic properties and strength can be obtained. When the amount of the bifunctional polymerizable monomer (II) is smaller than 10 wt %, strength and toughness required for rimless spectacles are hardly obtained and when the amount is larger than 80 wt %, the obtained composition has a problem that it is difficult to handle it because its viscosity becomes too high and the obtained cured product has a problem that satisfactory photochromic properties cannot be obtained with a long fading half-life period because its structure becomes too stiff and the molecular movement of the photochromic compound is thereby restricted.

As for the latter polymerization curable composition which contains a photopolymerization initiator, when the amount of the polyfunctional polymerizable monomer (I) is smaller than 1 wt %, satisfactory photochromic properties cannot be obtained and when the amount is larger than 60 wt %, strength and toughness required for rimless spectacles are hardly obtained. The preferred amount of the polyfunctional polymerizable monomer which depends on its structure is preferably 10 to 30 wt %, particularly preferably 15 to 25 wt % when $R^1$ is a methyl group and a is 0 and preferably 30 to 60 wt %, particularly preferably 40 to 60 wt % in other cases. Within the above range, a cured product having excellent balance between photochromic properties and strength can be obtained. When the amount of the bifunctional polymerizable monomer (II) is smaller than 10 wt %, strength and toughness required for rimless spectacles are hardly obtained and when the amount is larger than 90 wt %, the obtained composition has a problem that it is difficult to handle it because its viscosity becomes too high and the obtained cured product has a problem that satisfactory photochromic properties cannot be obtained with a long fading half-life period because its structure becomes too stiff and the molecular movement of the photochromic compound is thereby restricted.

According to the present invention, as described above, there are provided a photopolymerization curable composition comprising:

(I) a polyfunctional polymerizable monomer represented by the above formula (1);
(II) a bifunctional polymerizable monomer represented by the above formula (2);
(III) optional other polymerizable monomer different from the above polymerizbale monomers (I) and (II);
(IV) a photochromic compound; and
(V) a photopolymerization initiator, wherein
the amounts of the above polyfunctional polymerizable monomer (I), the above bifunctional polymerizable monomer (II) and the other polymerizable monomer (III) are 1 to 60 wt %, preferably 10 to 60 wt %, 10 to 90 wt %, preferably 20 to 90wt % andO to 89wt %, preferablyo to 70wt %, respectively, based on the total of all the polymerizable monomers, and a thermopolymerization curable composition comprising:

(I) a polyfunctional polymerizable monomer represented by the above formula (1);
(II) a bifunctional polymerizable monomer represented by the above formula (2);
(III) other polymerizable monomer different from the above polymerizbale monomers (I) and (II);
(IV) a photochromic compound; and
(V) a thermopolymerization initiator, wherein
the amounts of the above polyfunctional polymerizable monomer (I), the above bifunctional polymerizable monomer (II) and the other polymerizable monomer (III) are 1 to 15 wt %, preferably 3 to 10 wt %, 10 to 80 wt %, preferably 20 to 60 wt % and 5 to 89 wt %, preferably 30 to 77 wt %, respectively, based on the total of all the polymerizable monomers.

In the above photopolymerization curable composition and the above thermopolymerization curable composition, it is preferred that the bifunctional polymerizable monomer (II) should be a combination of a first bifunctional polymerizable monomer of the above formula (2) in which the average value of (m+n) is 0 to 5 and a second bifunctional polymerizable monomer of the above formula (2) in which the average value of (m+n) is 6 to 30 and that the molar amount of the second bifunctional polymerizable monomer should be 3 times or less larger than that of the first bifunctional polymerizable monomer.

The cured product obtained by curing the polymerization curable composition has excellent features such as excellent photochromic properties and high hardness, strength and toughness. The cured product can be particularly advantageously used as a photochromic plastic lens substrate for optical articles, especially rimless spectacles due to the above excellent features. When the cured product of the present invention is used for the above applications, a lens substrate molded and processed into a suitable shape can be used as a lens directly but may be subjected to a surface treatment as required to produce a lens. That is, the cured product may be subjected to a treatment with a silane coupling agent or a hard coating essentially composed of a sol component such as silicon, zirconium, antimony, aluminum, tin or tungsten, or to an anti-reflection treatment by the deposition of a thin film of a metal oxide such as $SiO_2$, $TiO_2$ or $ZrO_2$ or the coating of a thin film of an organic polymer to produce a lens.

Particularly in the case of the treatment with a hard coating, the shrinkage of a hard coat layer occurs in the curing step, by which stress remains in the substrate. As a result, after the hard coat layer is formed, the tensile strength of the substrate may be reduced by about 30 to 50 % from the tensile strength before the formation of the hard coat layer. As a result, strength required for the actual use of the substrate in rimless spectacles may not be ensured.

In the present invention, to solve the above problem, the hard coat layer is formed on the substrate not directly but preferably through a buffer layer which has adhesion to the substrate and the above hard coat layer and lower pencil hardness than the hard coat layer. By bonding the substrate to the hard coat layer through the buffer layer, stress applied to the substrate when the hard coat layer is formed can be eased, thereby making it possible to ensure the tensile strength of the substrate. As a result, strength that enables the substrate to be used in rimless spectacles can be ensured while excellent photochromic properties are obtained and the hard coat layer is formed.

The above buffer layer is not particularly limited if it has adhesion to the substrate and the above hard coat layer and is softer than the hard coat layer. Pencil hardness may be used as an index of the above softness. The pencil hardness of the buffer layer must be lower than the pencil hardness of the hard coat layer, preferably 6H or less, particularly preferably 4H or less from the viewpoint of its effect. As the buffer layer having this pencil hardness may be used a resin layer obtained by applying a primer used as a primer for plastic lenses and curing it, or a layer obtained by applying a coating having similar composition to a hard coating for forming a hard coat layer and comprising a component for softening a cured layer and curing it. More specifically, it is a resin layer obtained by applying a resin-based primer such as a polyurethane, polyester, polyvinyl acetal or epoxy-based primer and curing it, or a resin layer obtained by applying a mixture of a silane coupling agent used for a hard coat layer or a hard coating comprising a sol component such as silicon, zirconium, antimony, aluminum, tin, tungsten or titanium and one of the above resin-based primers and curing it.

Since the adhesion of the cured product of the composition of the prior art including the substrate used in the present invention to the hard coat layer is high, it is not especially necessary to apply a primer to the substrate from the viewpoint of adhesion. Therefore, a primer is not generally applied from the viewpoints of productivity and cost unless it is especially necessary.

It is preferred to use a urethane-based primer out of primers preferably used to form the above buffer layer because it has great stress reducing ability. A thermosetting urethane primer comprising a block polyisocyanate and a polyol as the main components is particularly preferred from the viewpoints of pot life and curing ease.

Examples of the block polyisocyanate include isocyanates such as hexamethylene diisocyanate, isophorone diisocyanate, tolylene diisocyanate and metaxylene diisocyanate blocked by phenol, $\epsilon$-caprolactam, activated methylene, MEK oxime or amine at a terminal.

Examples of the polyol include polyether polyols such as polypropylene glycol and polytetramethylene glycol; polyester polyols such as adipate-based polyols comprising adipic acid, a glycol and a polyhydric alcohol, polycaprolactone polyols comprising $\epsilon$-caprolactone, a glycol and a polyhydric alcohol, aromatic polyester polyols comprising terephthalic acid or isophthalic acid, a glycol and a polyhydric alcohol, and polycarbonate diols comprising ethylene carbonate and a glycol; polyolefin-based polyols such as polybutadiene polyol, hydrogenated polybutadiene polyol and hydrogenated isoprene polyol; and acrylic polyols obtained by copolymerizing a (meth)acrylic monomer having a hydroxyl group, (meth)acrylic ester and styrene.

These thermosetting urethane primers comprising a block polyisocyanate and a polyol as the main components are diluted with a solvent before use. Examples of the solvent include butyl acetate, methoxypropyl acetate and solvent naphtha.

To cure the thermosetting urethane primers, a known catalyst such as a tertiary amine or organic tin compound is used.

The means of forming a buffer layer on the substrate is not particularly limited and may be dipping, spin coating or dip spin coating. A thermosetting primer can be cured by heating at a temperature of 70 to 130° C. for 10 to 120 minutes and a photocurable primer can be cured by exposure to energy rays such as ultraviolet rays for 10 seconds to 5 minutes. The thickness of the thus obtained buffer layer is preferably 0.1 to 10 µm. When the thickness of the buffer layer is smaller than 0.1 µm, the adhesion of the buffer layer lowers and when the thickness is larger than 10 µm, photochromic properties may be impaired disadvantageously. Before a primer solution is applied, to improve adhesion, the substrate is preferably subjected to a pre-treatment such as degreasing with an organic solvent, chemical treatment with a basic or acid aqueous solution, polishing with an abrasive, plasma treatment with atmospheric plasma or low-pressure plasma, corona discharge treatment, flame treatment or UV ozone treatment.

The optical article of the present invention can be obtained by forming a hard coat layer on the buffer layer of the substrate having a buffer layer formed thereon as described above. The hard coat layer can be formed by applying a hard coating (hard coating solution) to the above buffer layer and curing it as in the method of the prior art. The type of the hard coat solution and the method of forming the hard coat layer are not particularly limited, and known hard coat solutions and known methods may be used.

For example, a silane coupling agent or a hard coating solution comprising a sol component such as silicon, zirconium, antimony, aluminum, tin or tungsten as the main component may be used.

The means of forming the hard coat layer on the buffer layer is not particularly limited and may be dipping, spin coating or dip spin coating. A thermosetting hard coat solution may be cured by heating at a temperature of 70 to 130° C. for 10 to 120 minutes and a photocurable hard coating solution can be cured by exposure to energy rays such as ultraviolet rays for 10 seconds to 5 minutes. Before a hard coating solution is applied, to improve adhesion, the substrate may be subjected to a pre-treatment such as degreasing with an organic solvent, chemical treatment with a basic or acid aqueous solution, polishing with an abrasive, plasma treatment with atmospheric plasma or low-pressure plasma, corona discharge treatment, flame treatment or UV ozone treatment.

EXAMPLES

The following examples are provided for the purpose of further illustrating the present invention but are in no way to be taken as limiting.

The abbreviations and names of the compounds used in the examples and comparative examples are given below.

1) bifunctional polymerizable monomers
BPE100: 2,2-bis(4-methacryloyloxypolyethoxyphenyl)propane (average value of (m+n) is 2.6)
BPE200: 2,2-bis(4-methacryloyloxypolyethoxyphenyl)propane (average value of (m+n) is 4)
BPE500: 2,2-bis(4-methacryloyloxypolyethoxyphenyl)propane (average value of (m+n) is 10)
PDBP: 2,2-bis(4-methacryloyloxypolypropoxyphenyl)propane (average value of (m+n) is 4)

2) polyfunctional polymerizable monomers
TMPT: trimethylolpropane trimethacrylate
TMPT3EO: ethoxylated trimethylolpropane trimethacrylate
AD-TMP-4CL: caprolactam modified ditrimethylolpropane tetraacrylate
3) other polymerizable monomers
4PGX: tetrapropylene glycol dimethacrylate
4G: tetraethylene glycol dimethacrylate
M90G: methyl ether polyethylene glycol methacrylate having an average molecular weight of 475
A200: tetraethylene glycol diacrylate
A400: nonaethylene glycol diacrylate
APG200: tripropylene glycol diacrylate
PKA5009: methoxypolyethylene glycol allyl ether (n=11)
GMA: glycidyl methacrylate
αMS: α-methylstyrene
MSD: α-methylstyrene dimer
U-1084: polyurethane oligomer tetraacrylate (M/v=440)
EB-1830: polyester oligomer hexaacrylate (M/v=300)
4) additive
Tween20: polyoxyethylene(20)sorbitan monolaurate
5) photochromic compounds
chromene 1: compound having the following structure (fading half-life period of the compound in the curable composition is 0.4 minute)

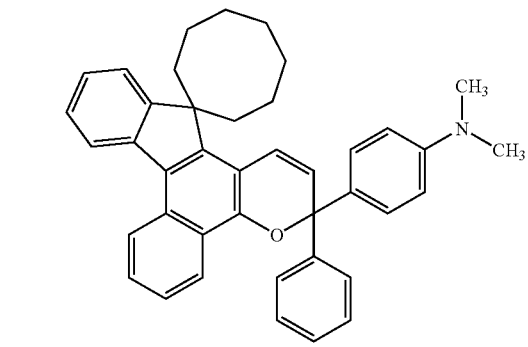

chromene 2: compound having the following structure (fading half-life period of the compound in the curable composition is 0.3 minute)

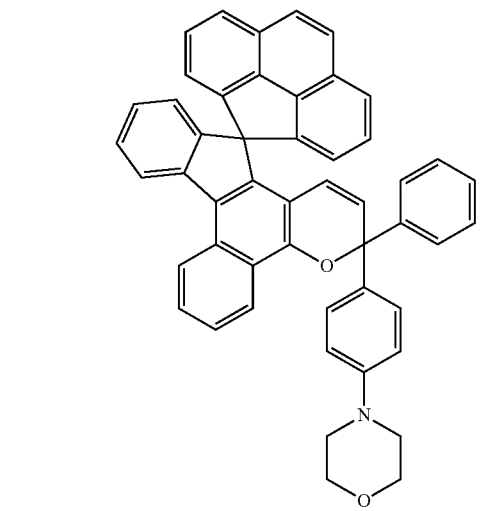

6) thermopolymerization initiator perbutyl ND: t-butyl peroxyneodecanoate 7) photopolymerization initiator Irgacure 819: bis(2,4,6-trimethylbenzoyl)phenylphosphine oxide 8) strength The obtained cured product was shaped into a disk-like specimen having a thickness of 2 mm and a diameter of 5 cm, two 2 mm-diameter holes were drilled in the disk-like specimen with points 4 mm from the end of the specimen on the lines of the diameter of the disk-like specimen as the centers thereof, 1.6 mm-diameter stainless steel rods were inserted into the obtained two holes and fixed to the upper and lower chucks of a tensile tester while they were laid through the specimen, and a tensile test was made at a rate of 5 mm/min to measure the tensile strength of the specimen. Seven specimens were measured and the average value of the measurement data excluding the largest and smallest data was obtained.

9) Photochromic properties

The obtained cured product (disk-like product having a thickness of 2 mm and a diameter of 5 cm) was exposed to light from the L-2480 (300W) SHL-100 xenon lamp of Hamamatsu Photonics Co., Ltd. through an aeromass filter (of Corning Co., Ltd.) at 20° C.±1° C. and a beam intensity on the surface of a polymer of 2.4 mW/cm$^2$ at 365 nm and 24 µW/cm$^2$ at 245 nm for 120 seconds to develop color so as to measure the photochromic properties of the above specimen.

Photochromic properties were evaluated by the following methods.

(1) Maximum absorption wavelength (λmax): This is the maximum absorption wavelength after color development measured with the spectrophotometer (MCPD1000 instantaneous multi-channel photodetector) of Ohtsuka Denshi Kogyo Co., Ltd. The maximum absorption wavelength is connected with the tone of a developed color.
(2) Color development density: This is the difference {ε(120)-ε(0)} between absorbance at the maximum absorption wavelength {ε(120)} after 120 seconds of exposure and absorbance before exposure {ε(0)}. As this value becomes larger, photochromism becomes better.
(3) Fading half-life period [($t_{1/2}$(min.)): After 120 seconds of exposure, exposure is stopped to measure the time it takes for the absorbance at the maximum wavelength of the specimen to drop to ½ of {ε(120)-ε(0)}. As this time becomes shorter, the fading rate becomes higher and photochromism becomes better.

10) pencil hardness

The end of a pencil is sharpened and pressed against the buffer layer vertically under a load of 1 kg. The pencil is pulled while placed under load to check whether the buffer layer is scratched or not so as to evaluate the hardness of the buffer layer. When the buffer layer is scratched with a 5H pencil, its pencil hardness is 4H.

11) Rockwell hardness

This is a value determined based on JIS K7202. More specifically, after a standard load of 10 Kgf is applied to the surface of the cured product specimen by using a 6,350 mm-diameter steel ball indenter, a test load of 60 Kgf is then applied and the load is returned to the standard load, this value is obtained from the difference h (unit of mm) in the indentation of the indenter before and after the application of the standard load based on the expression (130-500 h).

Example 1

50 parts by weight of BPE100, 5 parts by weight of TMPT, 5 parts by weight of A200, 24 parts by weight of 4G, 10 parts by weight of GMA, 5 parts by weight of aMS and 1 part by weight of MSD were fully mixed together. 0.03 part by weight of chromene 1 and 1 part by weight of perbutyl ND as a thermopolymerization initiator were added to this mixture and fully mixed together. This mixture solution was injected into a mold comprising a glass mold and a gasket made of an ethylene-vinyl acetate copolymer. After 5 hours of thermopolymerization at 90° C., the obtained cured product was taken out from the glass mold. The photochromic properties and strength of the obtained cured product were evaluated. The results are shown in Table 1.

Example 2

15 parts by weight of BPE100, 10 parts by weight of BPE500, 5 parts by weight of TMPT, 49 parts by weight of 4G, 5 parts by weight of A200, 10 parts by weight of GMA, 5 parts by weight of aMS and 1 part by weight of MSD were fully mixed together. 0.03 part by weight of chromene 1 and 1 part by weight of perbutyl ND as a thermopolymerization initiator were added to this mixture and fully mixed together. This mixture solution was injected into a mold comprising a glass mold and a gasket made of an ethylene-vinyl acetate copolymer. After 5 hours of thermopolymerization at 90° C., the obtained cured product was taken out from the glass mold. The photochromic properties and strength of the obtained cured product were evaluated. The results are shown in Table 1.

Examples 3 to 9

Cured products were obtained by polymerizing polymerization curable compositions shown in Table 1 and the photochromic properties and strength of the obtained cured products were evaluated in the same manner as in Example 1. The results are shown in Table 1.

Comparative Example 1

50 parts by weight of BPE100, 20 parts by weight of TMPT, 9 parts by weight of 4G, 5 parts by weight of A200, 10 parts by weight of GMA, 5 parts by weight of αMS and 1 part by weight of MSD were fully mixed together. 0.03 part by weight of chromene 1 and 1 part by weight of perbutyl ND as a thermopolymerization initiator were added to this mixture and fully mixed together. This mixture solution was injected into a mold comprising a glass mold and a gasket made of an ethylene-vinyl acetate copolymer. After 5 hours of thermopolymerization at 90° C., the obtained cured product was taken out from the glass mold. The photochromic properties and strength of the obtained cured product were evaluated. The results are shown in Table 1.

Comparative Examples 2 and 3

Cured products were obtained by polymerizing polymerization curable compositions shown in Table 1 in the same manner as in Comparative Example 1. The evaluation results of the photochromic properties and strength of the obtained cured products are shown in Table 1.

TABLE 1

| No. | bifunctional polymerizable monomer (parts by weight) | polyfunctional polymerizable monomer (parts by weight) | other polymerizable monomer (parts by weight) | additive (parts by weight) | photochromic compound (parts by weight) |
|---|---|---|---|---|---|
| Ex. 1 | BPE100 50 | TMPT 5 | 4G/A200/GMA/αMS/MSD 24/5/10/5/1 | — | Chromene 1 0.03 |
| Ex. 2 | BPE100/BPE500 15/10 | TMPT 5 | 4G/A200/GMA/αMS/MSD 49/5/10/5/1 | — | Chromene 1 0.03 |
| Ex. 3 | BPE100 50 | TMPT 10 | 4G/A200/GMA/αMS/MSD 22/2/10/5/1 | — | Chromene 1 0.03 |
| Ex. 4 | BPE100 20 | TMPT 5 | 4G/A200/GMA/αMS/MSD 54/5/10/5/1 | — | Chromene 1 0.03 |
| Ex. 5 | BPE100/BPE500 5/30 | TMPT 5 | 4G/A200/GMA/αMS/MSD 39/5/10/5/1 | — | Chromene 1 0.03 |
| Ex. 6 | BPE100 50 | TMPT3EO 15 | 4G/A200/GMA/αMS/MSD 9/10/10/5/1 | — | Chromene 1 0.03 |
| Ex. 7 | PDBP 50 | TMPT 5 | 4PGX/APG200/GMA/αMS/MSD 24/5/10/5/1 | — | Chromene 2 0.03 |
| Ex. 8 | BPE100 50 | TMPT 2 | 4G/A400/GMA/αMS/MSD 24/8/10/5/1 | — | Chromene 2 0.03 |
| Ex. 9 | BPE200 20 | TMPT 5 | 4G/M90G/GMA/αMS/MSD 44/15/10/5/1 | — | Chromene 2 0.03 |
| C. Ex. 1 | BPE100 50 | TMPT 20 | 4G/A200/GMA/αMS/MSD 9/5/10/5/1 | — | Chromene 1 0.03 |
| C. Ex. 2 | BPE100 50 | — | 4G/A200/GMA/αMS/MSD 32/2/10/5/1 | — | Chromene 2 0.03 |
| C. Ex. 3 | — | TMPT 15 | 4G/A200/GMA/αMS/MSD 64/5/10/5/1 | — | Chromene 2 0.03 |

| No. | strength property tensile strength (Kgf) | λmax (nm) | color development density | fading half-life period in cured product (minutes) | fading half-life period in curable composition (minutes) |
|---|---|---|---|---|---|
| Ex. 1 | 33 | 588 | 1.3 | 2.0 | 0.4 |
| Ex. 2 | 27 | 588 | 1.3 | 2.0 | 0.4 |
| Ex. 3 | 20 | 588 | 1.4 | 1.9 | 0.4 |
| Ex. 4 | 27 | 588 | 1.3 | 2.0 | 0.4 |
| Ex. 5 | 25 | 588 | 1.3 | 2.0 | 0.4 |
| Ex. 6 | 34 | 588 | 1.3 | 2.2 | 0.4 |
| Ex. 7 | 30 | 592 | 1.0 | 1.7 | 0.3 |
| Ex. 8 | 35 | 592 | 0.8 | 1.8 | 0.3 |
| Ex. 9 | 25 | 592 | 0.9 | 1.7 | 0.3 |
| C. Ex. 1 | 11 | 588 | 1.4 | 1.9 | 0.4 |
| C. Ex. 2 | 35 | 592 | 0.6 | 4.2 | 0.3 |
| C. Ex. 3 | 12 | 592 | 0.7 | 1.7 | 0.3 |

Ex: Example,
C. Ex: Comparative Example

It is understood from Table 1 that when a bifunctional polymerizable monomer and a polyfunctional polymerizable monomer are blended in a specific ratio, a cured product having excellent photochromic properties and strength that allows for its use in rimless spectacles can be obtained.

Example 11

30 parts by weight of TMPT, 60 parts by weight of BPE500 and 10 parts by weight of GMA were fully mixed together. 0.04 part by weight of chromene 1 and 0.01 part by weight of Irgacure 819 as a photopolymerization initiator were added to this mixture and fully mixed together under no light. This mixture solution was injected into a mold comprising a glass mold and a gasket made of an ethylene-vinyl acetate copolymer. This was exposed to light from a metal halide lamp for 2 minutes. After exposure, the obtained cured product was taken out from the glass mold.

The evaluation results of the photochromic properties and strength of the obtained cured product are shown in Table 2. The "fading half-life period in monomer solution" in Table 2 means the fading half-life period of the photochromic compound in the mixture solution (curable composition) before it is cured.

Example 12

25 parts by weight of TMPT, 45 parts by weight of BPE500, 20 parts by weight of U-1084 and 10 parts by weight of GMA were fully mixed together. 0.04 part by weight of chromene 1 and 0.01 part by weight of Irgacure 819 as a photopolymerization initiator were added to this mixture and fully mixed together under no light. This mixture solution was injected into a mold comprising a glass mold and a gasket made of an ethylene-vinyl acetate copolymer. The mixture solution was exposed to light from a metal halide lamp for 2 minutes. After exposure, the obtained cured product was taken out from the glass mold.

The evaluation results of the photochromic properties and strength of the obtained cured product are shown in Table 2.

Example 13

25 parts by weight of TMPT, 45 parts by weight of BPE500, 20 parts by weight of EB-1830 and 10 parts by weight of GMA were fully mixed together. 0.04 part by weight of chromene 1 and 0.01 part by weight of Irgacure 819 as a photopolymerization initiator were added to this mixture and fully mixed together under no light. This mixture solution was injected into a mold comprising a glass mold and a gasket made of an ethylene-vinyl acetate copolymer. The mixture solution was exposed to light from a metal halide lamp for 2 minutes. After exposure, the obtained cured product was taken out from the glass mold.

The evaluation results of the photochromic properties and strength of the obtained cured product are shown in Table 2.

Example 14

20 parts by weight of TMPT, 30 parts by weight of BPE100, 40 parts by weight of BPE500 (the ratio of the number of mols (a1) of BPE100 to the number of mols (a2) of BPE500 was 1.26) and 10 parts by weight of GMA were fully mixed together. 0.04 part by weight of chromene 1, 0.01 part by weight of Irgacure 819 as a photopolymerization initiator and 0.5 part by weight of perbutyl IB as a thermopolymerization initiator were added to this mixture and fully mixed together under no light. This mixture solution was injected into a mold comprising a glass mold and a gasket made of an ethylene-vinyl acetate copolymer. The mixture solution was exposed to light from a metal halide lamp for 2 minutes. After exposure, thermopolymerization was carried out at 90° C. for 5 hours, and the obtained cured product was taken out from the glass mold.

The evaluation results of the photochromic properties and strength of the obtained cured product are shown in Table 2.

Example 15

50 parts by weight of AD-TMP-4CL, 40 parts by weight of BPE500 and 10 parts by weight of GMA were fully mixed together. 0.04 part by weight of chromene 1, 0.01 part by weight of Irgacure 819 as a photopolymerization initiator and 0.5 part by weight of perbutyl IB as a thermopolymerization initiator were added to this mixture and fully mixed together under no light. This mixture solution was injected into a mold comprising a glass mold and a gasket made of an ethylene-vinyl acetate copolymer. The mixture solution was exposed to light from a metal halide lamp for 2 minutes. After exposure, thermopolymerization was carried out at 90° C for 5 hours, and the obtained cured product was taken out from the glass mold.

The evaluation results of the photochromic properties and strength of the obtained cured product are shown in Table 2.

Comparative Example 4

70 parts by weight of TMPT, 20 parts by weight of BPE500 and 10 parts by weight of GMA were fully mixed together. 0.04 part by weight of chromene 1 and 0.01 part by weight of Irgacure 819 as a photopolymerization initiator were added to this mixture and fully mixed together under no light. This mixture solution was injected into a mold comprising a glass mold and a gasket made of an ethylene-vinyl acetate copolymer. The mixture solution was exposed to light from a metal halide lamp for 2 minutes. After exposure, the obtained cured product was taken out from the glass mold.

The evaluation results of the photochromic properties and strength of the obtained cured product are shown in Table 2.

TABLE 2

| | photochromic properties | | | | strength property |
|---|---|---|---|---|---|
| | | color | fading half-life period (minutes) | | |
| No. | λmax/nm | development density | cured product | monomer solution | tensile strength/Kgf |
| Ex. 11 | 588 | 1.5 | 1.8 | 0.4 | 30 |
| Ex. 12 | 588 | 1.4 | 1.9 | 0.4 | 35 |
| Ex. 13 | 588 | 1.3 | 2.0 | 0.4 | 27 |
| Ex. 14 | 588 | 1.5 | 1.8 | 0.4 | 32 |
| Ex. 15 | 588 | 1.3 | 2.0 | 0.4 | 30 |
| C. Ex. 4 | 588 | 1.4 | 1.8 | 0.3 | 11 |

Ex: Example,
C. Ex: Comparative Example

Example 16

10 parts by weight of TMPT, 60 parts by weight of BPE100, 20 parts by weight of A400 and 10 parts by weight of GMA were fully mixed together. 0.04 part by weight of chromene 1 and 1 part by weight of perbutyl ND as a thermopolymerization initiator were added to this mixture and fully mixed together This mixture solution was injected into a mold comprising a glass mold and a gasket made of an ethylene-vinyl acetate copolymer. After 5 hours of thermopolymerization at 90° C., the cured product was taken out from the glass mold.

The evaluation result of the strength of the cured product is shown in Table 3.

The fading half-life period in the curable composition in Table 3 was measured separately by preparing a curable composition having the same concentration.

A coating solution for a buffer layer prepared by mixing together Desmodule BL3475 (isocyanate group of hexamethylene diisocyanate is blocked with activated methylene; manufactured by Sumika Bayer Urethane Co., Ltd.) and Desmophen 670BA (polyester polyol; manufactured by Sumika Bayer Urethane Co., Ltd.) in a ratio of 1:1 was applied to the cured product by dipping and cured at 110° C. for 30 minutes. Further, the TS-56H hard coating solution (organic silicon-based sol; manufactured by Tokuyama Corporation) was applied to the cured product by dipping and cured at 120° C. for 3 hours. The buffer layer of the obtained hard coated product was as thick as 3 µm and had a pencil hardness of H. When the pencil strength of the hard coated surface of the hard coated product was measured, it was 8H.

The evaluation results of the strength and photochromic properties of the cured product having a buffer layer and a hard coat layer are shown in Table 3.

Example 17

A coating solution for a buffer layer prepared by adding 5 wt % of triethylamine to bisphenol A epoxy resin was applied to the cured product (before a buffer layer and a hard coat layer were formed) obtained in Example 16 by dipping and cured at 110° C. for 30 minutes. Further, the TS-56H hard coating solution was applied to the cured product by dipping and cured at 120° C. for 3 hours. The buffer layer of the obtained hard coated product was as thick as 3 µm and had a pencil hardness of 2 H.

The evaluation results of the strength and photochromic properties of the cured product having a buffer layer and a hard coat layer are shown in Table 3.

Example 18

A coating solution for a buffer layer containing KS (organic silicon containing titanium dioxide; manufactured by Kurehalenetech Co., Ltd.) was applied to the cured product (before a buffer layer and a hard coat layer were formed) obtained in Example 16 by dipping and cured at 110° C. for 30 minutes. Further, the TS-56H hard coating solution was applied to the cured product by dipping and cured at 120° C for 3 hours. The buffer layer of the obtained hard coated product was as thick as 3 μm and had a pencil hardness of 6H.

The evaluation results of the strength and photochromic properties of the cured product having a buffer layer and a hard coat layer are shown in Table 3.

Comparative Example 5

The cured product (before a buffer layer and a hard coat layer were formed) obtained in Example 16 was etched in a 10% aqueous solution of sodium hydroxide heated at 60° C. for 10 minutes, and the TS-56H hard coating solution (organic silicon-based sol of Tokuyama Corporation) was applied to the cured product by dipping and cured at 120° C. for 3 hours.

The evaluation results of the strength and photochromic properties of the obtained cured product having a hard coat layer formed thereon are shown in Table 3.

The invention claimed is:

1. A photochromic lens substrate, which comprises a cured product of a polymerization curable composition comprising:

(I) a polyfunctional polymerizable monomer represented by the following formula (1):

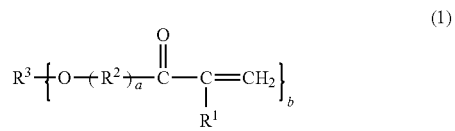

wherein $R^1$ is a hydrogen atom or methyl group, the group $-R^2-$ is $-CH_2CH_2O-$, $-CH_2CH(CH_3)O-$ or $-C(=O)CH_2CH_2CH_2CH_2O-$, $R^3$ is a trivalent to hexafunctional organic residue, a is an integer of 0 to 3 and b is an integer of 3 to 6;

(II) a bifunctional polymerizable monomer represented by the following formula (2):

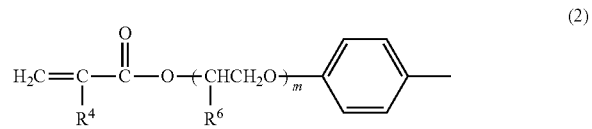

TABLE 3

|  |  | strength property | photochromic properties |  |  |  | other property rockwell |
|---|---|---|---|---|---|---|---|
|  |  |  |  | color | fading half-life period/minute |  |  |
|  |  | tensile strength/Kgf | λmax/nm | development density | cured product | curable composition | hardness of substrate |
| Ex. 16 | Before formation of hard coat layer | 22 | 588 | 1.4 | 1.9 | 0.4 | 90 |
|  | After formation of hard coat layer | 22 | 588 | 1.4 | 1.9 | 0.4 | 90 |
| Ex. 17 | Before formation of hard coat layer | 22 | 588 | 1.4 | 1.9 | 0.4 | 90 |
|  | After formation of hard coat layer | 22 | 588 | 1.4 | 1.9 | 0.4 | 90 |
| Ex. 18 | Before formation of hard coat layer | 22 | 588 | 1.4 | 1.9 | 0.4 | 90 |
|  | After formation of hard coat layer | 22 | 588 | 1.4 | 1.9 | 0.4 | 90 |
| C. Ex. 5 | Before formation of hard coat layer | 22 | 588 | 1.4 | 1.9 | 0.4 | 90 |
|  | After formation of hard coat layer | 15 | 588 | 1.4 | 1.9 | 0.4 | 90 |

Ex: Example,
C.Ex: Comparative Example

It is understood from Table 3 that when a hard coat layer is formed through a buffer layer on a cured product having excellent photochromic properties and strength that allows for its use in rimless spectacles, a hard coated cured product having excellent photochromic properties and strength that allows for its use in rimless spectacles can be obtained. When a hard coat layer is formed without a buffer layer, a reduction in strength is seen with the result that the cured product cannot be used in rimless spectacles.

-continued

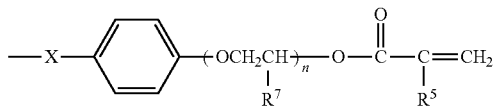

wherein $R^4$ and $R^5$ are each independently a hydrogen atom or methyl group, $R^6$ and $R^7$ are each independently a hydrogen atom or alkyl group having 1 or 2 carbon atoms, the group —X— is —O—, —S—, —S(=O)$_2$—, —C(=O)—O—, —CH$_2$—, —CH=CH— or —C(CH$_3$)$_2$—, and m and n satisfy (m+n)=0 to 30; and (III) another polymerizable monomer different than the above polymerizable monomers (I) and (II), selected from the group consisting of polyethylene glycol methacrylate having an average molecular weight of 526, polyethylene glycol methacrylate having an average molecular weight of 360, methyl ether polyethylene glycol methacrylate having an average molecular weight of 475, methyl ether polyethylene glycol methacrylate having an average molecular weight of 1,000, polypropylene glycol methacrylate having an average molecular weight of 375, polypropylene glycol methacrylate having an average molecular weight of 430, stearyl methacrylate, lauryl methacrylate, ethylene glycol glycidyl ether, propylene glycol glycidyl ether, tetraethylene glycol diacrylate, nonaethylene glycol diacrylate, diethylene glycol dimethacrylate, triethylene glycol dimethacrylate, tetraethylene glycol dimethacrylate, tripropylene glycol dimethacrylate, tetrapropylene glycol dimethacrylate, nonaethylene glycol dimethacrylate, nonapropylene glycol dimethacrylate, ethylene glycol bisglycidyl methacrylate, 1, 4-butylene glycol dimethacrylate, 1, 9-nonylene glycol dimethacrylate, neopentylene glycol dimethacrylate, polyallyl compounds, acrylate and methacrylate compounds, vinyl compounds, bifunctional to hexafunctional polymerizable polyurethane oligomers and bifunctional to hexafunctional polymerizable polyester oligomers;

(IV) a photochromic compound; and (V) a thermal polymerization initiator, wherein the amounts of the polyfunctional polymerizable monomer (I), the bifunctional polymerizable monomer (II) and the other polymerizable monomer (III) are 1 to 15 wt %, 10 to 80 wt % and 5 to 89 wt % based on the total of all the polymerizable monomers, respectively, the fading half-life period of the photochromic compound (IV) in the cured product is 30 times or less shorter than the fading half-life period of the photochromic compound (IV) in the polymerization curable composition, and said cured product has a tensile strength of 20 Kgf or more.

2. The lens substrate according to claim 1, wherein the bifunctional polymerizable monomer (II) is a combination of a first bifunctional polymerizable monomer of the above formula (2) in which (m+n) is 0 to 5 and a second bifunctional polymerizable monomer of the above formula (2) in which (m+n) is 6 to 30, and the molar amount of the second bifunctional polymerizable monomer is 3 times or less larger than that of the first bifunctional polymerizable monomer.

3. A photochromic lens which comprises the photochromic lens substrate of claim 1, a hard coat layer and a buffer layer, said buffer layer being interposed between the hard coat layer and the substrate and having lower pencil hardness than the hard coat layer, for bonding the substrate to the hard coat layer.

4. The photochromic lens substrate of claim 1, wherein the polyfunctional polymerizable monomer represented by formula (1) is at least one selected from the group consisting of trimethylolpropane trimethacrylate, trimethylolpropane triacrylate, tetramethylolmethane trimethacrylate, tetramethylolmethane triacrylate, tetramethylolmethane tetramethacrylate, tetramethylolmethane tetraacrylate, trimethylolpropane triethylene glycol trimethacrylate, trimethylolpropane triethylene glycol triacrylate, ethoxylated pentaerythritol tetraacrylate, ethoxylated pentaerythritol tetramethacrylate, pentaerythritol trimethacrylate, pentaerythritol tetramethacrylate, caprolactam modified ditrimethylolpropane tetraacrylate, caprolactam modified ditrimethylolpropane tetramethacrylate and caprolactam modified dipentaerythritol hexaacrylate, and wherein the bifunctional polymerizable monomer represented by formula (2) is at least one selected from the group consisting of:

2,2-bis[4-(methacryloyloxypolyethoxy)phenyl]propane (average value of (m+n) is 2),
2,2-bis[4-(methacryloyloxypolyethoxy)phenyl]propane (average value of (m+n) is 2.6),
2,2-bis[4-(methacryloyloxypolyethoxy)phenyl]propane (average value of (m+n) is 4),
2,2-bis[4-(methacryloyloxypolyethoxy)phenyl]propane (average value of (m+n) is 10),
2,2-bis[4-(methacryloyloxypolyethoxy)phenyl]propane (average value of (m+n) is 30),
2,2-bis[4-acryloyloxypolyethoxy]phenyl]propane (average value of (m+n) is 4),
2,2-bis[4-methacryloyloxypolypropoxy]phenyl]propane (average value of (m+n) is 4),
2,2-bis[4-methacryloyloxypolypropoxy]phenyl]propane (average value of (m+n) is 10),
bis[4-methacryloyloxypolyethoxy]phenyl]methane (average value of (m+n) is 4), and
bis[4-methacryloyloxypolyethoxy] phenyl] sulfone (average value of (m+n) is 4).

5. A polymerization curable composition for a photochromic lens substrate, the polymerization curable composition comprising:

(I) a polyfunctional polymerizable monomer represented by the following formula (1):

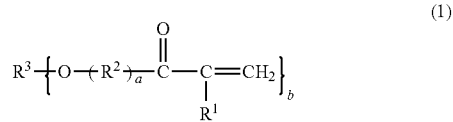

(1)

wherein $R^1$ is a hydrogen atom or methyl group, the group —$R^2$— is —CH$_2$CH$_2$O—, —CH$_2$CH(CH$_3$)O— or —C(=O)CH$_2$CH$_2$CH$_2$CH$_2$CH$_2$O—, $R^3$ is a trivalent to hexafunctional organic residue, a is an integer of 0 to 3 and b is an integer of 3 to 6;

(II) a bifunctional polymerizable monomer represented by the following formula (2):

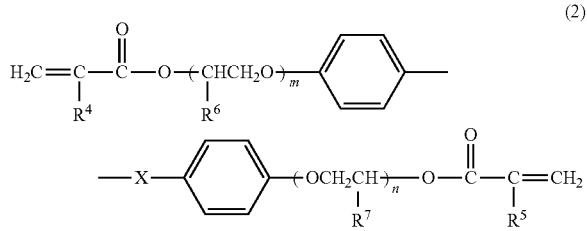

(2)

wherein $R^4$ and $R^5$ are each independently a hydrogen atom or methyl group, $R^6$ and $R^7$ are each independently a hydrogen atom or alkyl group having 1 or 2 carbon atoms, the group —X— is —O—, —S—, —S(=O)$_2$—, —C(=O)—O—, —CH$_2$—, —CH=CH— or —C(CH$_3$)$_2$—, and m and n satisfy (m+n)=0 to 30;

(III) another polymerizable monomer different from the above polymerizable monomers (I) and (II), selected from the group consisting of polyethylene glycol methacrylate having an average molecular weight of 526, polyethylene glycol methacrylate having an average molecular weight of 360, methyl ether polyethylene glycol methacrylate having an average molecular weight of 475, methyl ether polyethylene glycol methacrylate having an average molecular weight of 1,000, polypropylene glycol methacrylate having an average molecular weight of 375, polypropylene glycol methacrylate having an average molecular weight of 430, stearyl methacrylate, lauryl methacrylate, ethylene glycol glycidyl ether, propylene glycol glycidyl ether, tetraethylene glycol diacrylate, nonaethylene glycol diacrylate, diethylene glycol dimethacrylate, triethylene glycol dimethacrylate, tetraethylene glycol dimethacrylate, tripropylene glycol dimethacrylate, tetrapropylene glycol dimethacrylate, nonaethylene glycol dimethacrylate, nonapropylene glycol dimethacrylate, ethylene glycol bisglycidyl methacrylate, 1, 4-butylene glycol dimethacrylate, 1, 9-nonylene glycol dimethacrylate, neopentylene glycol dimethacrylate, polyallyl compounds, acrylate and methacrylate compounds, vinyl compounds, bifunctional to hexafunctional polymerizable polyurethane oligomers and bifunctional to hexafunctional polymerizable polyester oligomers;

(IV) a photochromic compound; and (V) a thermopolymerization initiator, wherein the amounts of the polyfunctional polymerizable monomer (I), the bifunctional polymerizable monomer (II) and the other polymerizable monomer (III) are 1 to 15 wt %, 10 to 80 wt % and 5 to 89 wt % based on the total of all the polymerizable monomers, respectively, the fading half-life period of the photochromic compound (IV) in the cured product is 30 times or less shorter than the fading half-life period of the photochromic compound (IV) in the polymerization curable composition, and a cured product of said polymerization curable composition has a tensile strength of 20 Kgf or more.

6. The composition according to claim 5, wherein the amounts of the polyfunctional polymerizable monomer (I), the bifunctional polymerizable monomer (II) and the other polymerizable monomer (III) are 3 to 10 wt %, 20 to 60 wt % and 30 to 77 wt %, respectively.

7. The composition according to claim 5, wherein the bifunctional polymerizable monomer (II) is a combination of a first bifunctional polymerizable monomer of the above formula (2) in which (m+n) is 0 to 5 and a second bifunctional polymerizable monomer of the above formula (2) in which (m+n) is 6 to 30, and the molar amount of the second bifunctional polymerizable monomer is 3 times or less larger than that of the first bifunctional polymerizable monomer.

8. A polymerization curable composition for a photochromic lens substrate, the polymerization curable composition comprising:

(I) a polyfunctional polymerizable monomer represented by the following formula (1):

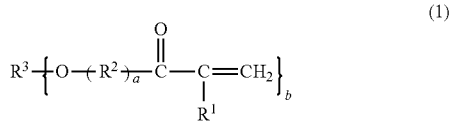

wherein $R^1$ is a hydrogen atom or methyl group, the group $-R^2-$ is $-CH_2CH_2O-$, $-CH_2CH(CH_3)O-$ or $-C(=O)CH_2CH_2CH_2CH_2CH_2O-$, $R^3$ is a trivalent to hexafunctional organic residue, a is an integer of 0 to 3 and b is an integer of 3 to 6;

(II) a bifunctional polymerizable monomer represented by the following formula (2):

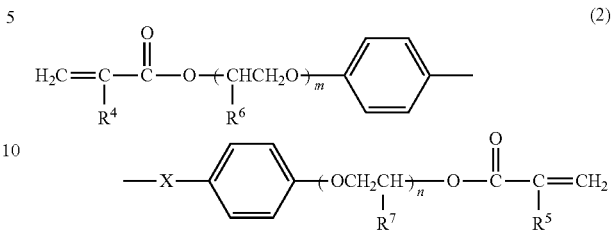

wherein $R^4$ and $R^5$ are each independently a hydrogen atom or methyl group, $R^6$ and $R^7$ are each independently a hydrogen atom or alkyl group having 1 or 2 carbon atoms, the group $-X-$ is $-O-$, $-S-$, $-S(=O)_2-$, $-C(=O)-O-$, $-CH_2-$, $-CH=CH-$ or $-C(CH_3)_2-$, and m and n satisfy (m+n)=0 to 30;

(III) another polymerizable monomer different from the above polymerizable monomers (I) and (II), selected from the group consisting of polyethylene glycol methacrylate having an average molecular weight of 526, polyethylene glycol methacrylate having an average molecular weight of 360, methyl ether polyethylene glycol methacrylate having an average molecular weight of 475, methyl ether polyethylene glycol methacrylate having an average molecular weight of 1,000, polypropylene glycol methacrylate having an average molecular weight of 375, polypropylene glycol methacrylate having an average molecular weight of 430, stearyl methacrylate, lauryl methacrylate, ethylene glycol glycidyl ether, propylene glycol glycidyl ether, tetraethylene glycol diacrylate, nonaethylene glycol diacrylate, diethylene glycol dimethacrylate, triethylene glycol dimethacrylate, tetraethylene glycol dimethacrylate, tripropylene glycol dimethacrylate, tetrapropylene glycol dimethacrylate, nonaethylene glycol dimethacrylate, nonapropylene glycol dimethacrylate, ethylene glycol bisglycidyl methacrylate, 1, 4-butylene glycol dimethacrylate, 1, 9-nonylene glycol dimethacrylate, neopentylene glycol dimethacrylate, polyallyl compounds, acrylate and methacrylate compounds, vinyl compounds, bifunctional to hexafunctional polymerizable polyurethane oligomers and bifunctional to hexafunctional polymerizable polyester oligomers;

(IV) a photochromic compound; and (V) a thermopolymerization initiator, wherein:

the amounts of the polyfunctional polymerizable monomer (I), the bifunctional polymerizable monomer (II) and the other polymerizable monomer (III) are 1 to 15 wt %, 10 to 80 wt % and 5 to 89 wt % based on the total of all the polymerizable monomers, respectively;

the fading half-life period of the photochromic compound (IV) in the cured product is 30 times or less shorter than the fading half-life period of the photochromic compound (IV) in the polymerization curable composition;

a cured product of said polymerization curable composition has a tensile strength of 20 Kgf or more; and the polyfunctional polymerizable monomer represented by formula (1) is at least one selected from the group consisting of caprolactam modified ditrimethylolpropane tetraacrylate, caprolactam modified ditrimethylolpropane tetramethacrylate and caprolactam modified dipentaerythritol hexaacrylate.

* * * * *

UNITED STATES PATENT AND TRADEMARK OFFICE
CERTIFICATE OF CORRECTION

| | | |
|---|---|---|
| PATENT NO. | : 8,012,596 B2 | |
| APPLICATION NO. | : 10/549696 | |
| DATED | : September 6, 2011 | |
| INVENTOR(S) | : Junji Takenaka et al. | |

It is certified that error appears in the above-identified patent and that said Letters Patent is hereby corrected as shown below:

ON THE TITLE PAGE:

At item (45), Date of Patent, insert --*-- immediately before the date to indicate that the patent is subject to a Terminal Disclaimer, i.e., change "Sep. 6, 2011" to --*Sep. 6, 2011--.

At section (*), Notice, insert the following new Notice:

--This patent is subject to a terminal disclaimer.--.

In claim 4, at column 26, commencing at line 15 to the end of the claim, change:

"2,2-bis[4-acryloyloxypolyethoxy]phenyl]propane (average value of (m + n) is 4),
2,2-bis[4-methacryloyloxypolypropoxy]phenyl]propane (average value of (m + n) is 4),
2,2-bis[4-methacryloyloxypolypropoxy]phenyl]propane (average value of (m + n) is 10),
bis[4-methacryloyloxypolyethoxy]phenyl]methane (average value of (m + n) is 4), and
bis[4-methacryloyloxypolyethoxy]phenyl]sulfone (average value of (m + n) is 4)."

to      --2,2-bis[4-(acryloyloxypolyethoxy)phenyl]propane (average value of (m + n) is 4),
2,2-bis[4-(methacryloyloxypolypropoxy)phenyl]propane (average value of (m + n) is 4),
2,2-bis[4-(methacryloyloxypolypropoxy)phenyl]propane (average value of (m + n) is 10),
bis[4-(methacryloyloxypolyethoxy)phenyl]methane (average value of (m + n) is 4), and
bis[4-(methacryloyloxypolyethoxy)phenyl]sulfone (average value of (m + n) is 4).--.

Signed and Sealed this
Twenty-second Day of November, 2011

David J. Kappos
*Director of the United States Patent and Trademark Office*